(12) United States Patent
Liu et al.

(10) Patent No.: US 11,941,838 B2
(45) Date of Patent: Mar. 26, 2024

(54) METHODS, APPARATUSES, DEVICES AND STORAGE MEDIUM FOR PREDICTING CORRELATION BETWEEN OBJECTS

(71) Applicant: SENSETIME INTERNATIONAL PTE. LTD., Singapore (SG)

(72) Inventors: Chunya Liu, Singapore (SG); Xuesen Zhang, Singapore (SG); Bairun Wang, Singapore (SG); Jinghuan Chen, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 486 days.

(21) Appl. No.: 17/363,244

(22) Filed: Jun. 30, 2021

(65) Prior Publication Data
US 2022/0301219 A1 Sep. 22, 2022

Related U.S. Application Data

(63) Continuation of application No. PCT/IB2021/054778, filed on Jun. 1, 2021.

(30) Foreign Application Priority Data

Mar. 17, 2021 (SG) .................... 10202102717U (51) Int. Cl.
*G06T 7/73* (2017.01)
*G06K 9/00* (2022.01)
(Continued)

(52) U.S. Cl.
CPC ............... *G06T 7/73* (2017.01); *G06V 20/46* (2022.01); *G06V 40/107* (2022.01);
(Continued)

(58) Field of Classification Search
CPC ...... G06V 10/82; G06V 40/161; G06V 40/10; G06V 40/107; G06V 10/25; G06V 40/103;
(Continued)

(56) References Cited

U.S. PATENT DOCUMENTS

| 2013/0051662 | A1* | 2/2013 | Shiozaki | G06V 40/161 |
| | | | | 382/159 |
| 2015/0046375 | A1* | 2/2015 | Mandel | G06T 13/40 |
| | | | | 706/11 |

FOREIGN PATENT DOCUMENTS

| CN | 109977872 | 7/2019 |
| CN | 110647834 | 1/2020 |

(Continued)

OTHER PUBLICATIONS

PCT International Search Report in International Appln No. PCT/IB2021/054778, dated Aug. 5, 2021, 3 pages.
(Continued)

*Primary Examiner* — Michael J Vanchy, Jr.
(74) *Attorney, Agent, or Firm* — Fish & Richardson P.C.

(57) ABSTRACT

The present disclosure provides methods, apparatuses, devices and storage medium for predicting correlation between objects. The method can include: detecting a first object, a second object, and a third object involved in a target image, wherein the first object and the second object represent different body parts, and the third object indicates a body object; determining a joint bounding box surrounding the first object, the second object, and the third object; and predicting correlation between the first object and the second object based on a region corresponding to the joint bounding box in the target image.

18 Claims, 4 Drawing Sheets

(51) Int. Cl.
*G06V 20/40* (2022.01)
*G06V 40/10* (2022.01)
*G06V 40/16* (2022.01)

(52) U.S. Cl.
CPC .. *G06V 40/161* (2022.01); *G06T 2207/30201* (2013.01); *G06T 2210/12* (2013.01)

(58) Field of Classification Search
CPC ...... G06V 40/20; G06V 10/774; G06V 10/50; G06V 10/75; G06V 20/46; G06V 40/166; G06V 10/22; G06V 20/41; G06V 40/172; G06V 10/255; G06V 10/443; G06V 10/454; G06V 10/751; G06V 20/40; G06V 40/11; G06F 18/214; G06F 18/241; G06F 18/2413; G06T 7/11; G06T 2207/20081; G06T 2207/20084; G06T 2207/30196; G06T 2210/12; G06T 2207/10016; G06T 2207/20076; G06T 2207/30201; G06T 7/70; G06T 7/73; G06N 3/045; G06N 3/08; G06N 3/084; G06N 20/00; A63F 3/00
See application file for complete search history.

(56) References Cited

FOREIGN PATENT DOCUMENTS

| | | |
|---|---|---|
| CN | 110807385 | 2/2020 |
| CN | 111178126 | 5/2020 |
| CN | 111382655 | 7/2020 |
| CN | 111783724 | 10/2020 |
| CN | 111814885 | 10/2020 |
| CN | 112507786 | 3/2021 |
| SG | 10201913024 | 10/2020 |
| SG | 10202003027 | 10/2020 |

OTHER PUBLICATIONS

PCT International Written Opinion in International Appln No. PCT/IB2021/054778, dated Aug. 5, 2021, 5 pages.
SG Office Action issued in Singapore Appln. No.10202102717U, dated Aug. 5, 2021, 9 pages.
Office Action in Chinese Appln. No. 202180001682.6, dated Nov. 1, 2023, 14 pages (with English machine translation).

* cited by examiner

METHODS, APPARATUSES, DEVICES AND STORAGE MEDIUM FOR PREDICTING CORRELATION BETWEEN OBJECTS

CROSS-REFERENCE TO RELATED APPLICATION

The present application is a continuation of International Application No. PCT/IB2021/054778 filed on Jun. 1, 2021, which claims priority to Singapore Patent Application No. 10202102717U, filed on Mar. 17, 2021, all of which are incorporated herein by reference in their entirety.

TECHNICAL FIELD

The present disclosure relates to computer technology, in particular to methods, apparatuses, devices and storage medium for predicting correlation between objects.

BACKGROUND

Intelligent video analysis technology can assist people to understand states of objects in physical space and their relationship between each other. In an application scenario of intelligent video analysis, it is expected to recognize an identity of a person corresponding to a body part involved in the video.

The correlation between a body part and a personal identity can be distinguished by some intermediate information. For example, the intermediate information can indicate an object that has a relatively definite correlation with respect to both the body part and the personal identity. For example, when it is expected to confirm an identity of a person to whom the hand detected in the image belongs, it can be determined by a face that is correlated with the hand and indicates the identity of the person. Here, a correlated object can indicate that two objects have an attribution relationship with the same third object, or have the same identity information attribute. If two body parts are correlated objects, and it can be considered that the two body parts belong to the same person.

By correlating the body parts in the image, it can further assist analyzing the behaviors and states of the person in a multi-person scenario, and the relationship between a plurality of persons.

SUMMARY

In view of above, the present disclosure at least discloses a method for predicting correlation between objects. The method includes: detecting a first object, a second object, and a third object involved in a target image, wherein the first object and the second object represent different body parts, and the third object indicates a body object; determining a joint bounding box surrounding the first object, the second object, and the third object; and predicting correlation between the first object and the second object based on a region corresponding to the joint bounding box in the target image.

In some examples, determining a joint bounding box surrounding the first object, the second object, and the third object includes: determining a first surrounding box surrounding the first object and the second object based on respective detection results of the first object and the second object; and generating the joint bounding box surrounding the first object, the second object, and the third object based on the first surrounding box and a detection result of the third object.

In some examples, determining the first surrounding box surrounding the first object and the second object based on respective detection results of the first object and the second object includes: obtaining one or more object pairs by combining each of one or more detected first objects with each of one or more detected second objects; and for each of the object pairs, determining a first surrounding box surrounding the object pair; and/or, for each of the object pairs, generating the joint bounding box surrounding the first object, the second object, and the third object based on the first surrounding box and the detection result of the third object includes: obtain one or more ternary object sets by combining the object pair with each of one or more third objects, wherein the object pairs are obtained by combining each detected first object with each detected second object; and for each of the ternary object sets, generating a joint bounding box surrounding the ternary object set based on the first surrounding box of the object pair and a detection result of the third object in the ternary object set.

In some examples, the detection result includes a bounding box; and generating the joint bounding box surrounding the first object, the second object, and the third object based on the first surrounding box and the detection result of the third object includes: selecting one from a bounding box of a respective detected third object, as a target bounding box corresponding to the first surrounding box, in a way that an overlapping area between the selected bounding box and the first surrounding box is largest; and generating the joint bounding box surrounding the first object, the second object, and the third object based on the first surrounding box and the target bounding box.

In some examples, the first surrounding box indicates one of bounding boxes surrounding the first object and the second object of which area is smallest; and/or, the joint bounding box indicates an externally-connected joint bounding box which is externally connected with the first surrounding box.

In some examples, the joint bounding box indicates an externally-connected joint bounding box which is externally connected with the bounding box of the third object; or the joint bounding box indicates an externally-connected joint bounding box which is externally connected with the first surrounding box and the bounding box of the third object.

In some examples, predicting correlation between the first object and the second object based on the region corresponding to the joint bounding box in the target image includes: obtaining region features of the joint bounding box, and respective region features of the first object and the second object surrounded by the joint bounding box by inputting, the joint bounding box, and respective bounding boxes of the first object and the second object surrounded by the joint bounding box into a region feature extraction unit; obtain a spliced feature of a preset length by splicing the region features of the joint bounding box, the respective region features of the first object and the second object surrounded by the joint bounding box, and respective positions features of the first object and the second object surrounded by the joint bounding box; and predicting correlation between the first object and the second object based on the spliced feature.

In some examples, the method also includes: determining correlated objects involved in the target image based on a prediction result of the correlation between the first object and the second object.

In some examples, the prediction result of the correlation includes a correlation prediction score, determining correlated objects involved in the target image based on the prediction result of the correlation between the first object and the second object includes: selecting each from a plurality of object pairs, as a current object pair, in an order of respective correlation prediction scores of the object pairs from high to low, wherein the plurality of object pairs are obtained by combining each detected first object with each detected second object; and for the current object pair, based on the determined correlated objects involved in the target image, determining a number of second objects that are correlated with the first object in the current object pair as a first number, and determining a number of first objects that are correlated with the second object in the current object pair as a second number; and in response to that the first number is lower than a first preset threshold, and the second number is lower than a second preset threshold, determining the first object and the second object in the current object pair as correlated objects involved in the target image.

In some examples, the method also includes: outputting a detection result of the correlated objects involved in the target image.

In some examples, the correlation between the first object and the second object includes: a confidence regarding that the first object and the second object belong to one same body object.

In some examples, the first object includes a face object; and the second object includes a hand object.

In some examples, detecting the first object, the second object, and the third object involved in the target image includes: detecting the first object, the second object, and the third object involved in the target image with a target object detecting model; predicting the correlation between the first object and the second object based on the region corresponding to the joint bounding box in the target image includes: predicting the correlation between the first object and the second object based on the region corresponding to the joint bounding box in the target image with a correlation predicting model; wherein the target object detecting model and the correlation predicting model are trained by: training the target object detecting model based on a first training sample set which includes a plurality of training samples with respective first label information, wherein the first label information includes respective bounding boxes of a first object, a second object, and a third object; and jointly training the target object detecting model and the correlation predicting model based on a second training sample set which includes a plurality of training samples with second label information, wherein the second label information includes respective bounding boxes of a first object, a second object, and a third object, and respective label information on correlations between first objects and second objects.

The present disclosure also discloses an apparatus for predicting correlation between objects. The apparatus includes: an object detecting unit configured to detect a first object, a second object, and a third object involved in a target image, where the first object and the second object represent different body parts, and the third object indicates a body object; a determining unit configured to determine a joint bounding box surrounding the first object, the second object, and the third object; a correlation predicting unit configured to predict correlation between the first object and the second object based on a region corresponding to the joint bounding box in the target image.

In some examples, the determining unit includes: a determining sub-unit configured to determine a first surrounding box surrounding the first object and the second object based on respective detection results of the first object and the second object; a generating unit configured to generate the joint bounding box surrounding the first object, the second object, and the third object based on the first surrounding box and a detection result of the third object.

In some examples, the determining sub-unit is configured to: obtain one or more object pairs by combining each of one or more detected first objects with each of one or more detected second objects; for each of the object pairs, determine a first surrounding box surrounding the object pair; and/or, the generating unit is configured to: for each of the object pairs, obtain one or more ternary object sets by combining the object pair with each of one or more third objects, wherein the object pairs are obtained by combining each detected first object with each detected second object; and for each of the ternary object sets, generate a joint bounding box surrounding the ternary object set based on the first surrounding box of the object pair and a detection result of the third object in the ternary object set.

In some examples, the detection result includes a bounding box; and the generating unit is configured to: select one from a bounding box of a respective detected third objects, as a target bounding box corresponding to the first surrounding box, in a way that an overlapping area between the selected bounding box and the first surrounding box is largest; and generate the joint bounding box surrounding the first object, the second object, and the third object based on the first surrounding box and the target bounding box.

In some examples, the first surrounding box indicates one of bounding boxes surrounding the first object and the second object of which area is smallest; and/or, the joint bounding box indicates an externally-connected joint bounding box which is externally connected with the first surrounding box.

In some examples, the joint bounding box indicates an externally-connected joint bounding box which is externally connected with the bounding box of the third object; or the joint bounding box indicates an externally-connected joint bounding box which is externally connected with the first surrounding box and the bounding box of the third object.

In some examples, the correlation predicting unit includes: an input unit configured to obtain region features of the joint bounding box and respective region features of the first object and the second object surrounded by the joint bounding box by, inputting the joint bounding box and respective bounding boxes of the first object and the second object surrounded by the joint bounding box into a region feature extraction unit; a feature splicing unit configured to obtain a spliced feature of a preset length by splicing the region features of the joint bounding box, the respective region features of the first object and the second object surrounded by the joint bounding box, and respective positions features of the first object and the second object surrounded by the joint bounding box; a predicting sub-unit configured to predict correlation between the first object and the second object based on the spliced feature.

In some examples, the apparatus further includes: a correlated objects predicting unit configured to determine correlated objects involved in the target image based on a prediction result of the correlation between the first object and the second object.

In some of the examples, the correlation prediction result includes a correlation prediction score, and the correlation object predicting unit is configured to: select each from a plurality of object pairs as a current object pair, in an order of respective correlation prediction score of the object pairs from high to low, wherein the plurality of object pairs are obtained by combining each detected first object with each detected second object, and perform: for the current object pair, based on determined correlated objects involved in the target image, determine a number of second objects that are correlated with the first object in the current object pair as a first number, and determine a number of first objects that are correlated with the second object in the current object pair as a second number; in response to that the first number is lower than a first preset threshold, and the second number is lower than a second preset threshold, determine the first object and the second object in the current object pair as correlated objects involved in the target image.

In some examples, the apparatus further includes: an output unit configured to output a detection result of the correlated objects involved in the target image.

In some examples, the correlation between the first object and the second object includes: a confidence regarding that the first object and the second object belong to one same body object.

In some examples, the first object includes a face object; the second object includes a hand object.

In some examples, the object detecting unit is configured to: detect the first object, the second object, and the third object involved in the target image with a target object detecting model. The correlation predicting unit is configured to: predict the correlation between the first object and the second object based on the region corresponding to the joint bounding box in the target image with a correlation predicting model; wherein the target object detecting model and the correlation predicting model are trained by: training the target object detecting model based on a first training sample set which includes a plurality of training samples with respective first label information; wherein the first label information includes respective bounding boxes of a first object, a second object, and a third object; and jointly training the target object detecting model and the correlation predicting model based on a second training sample set which contains a plurality of training samples with respective second label information, wherein the second label information includes respective bounding boxes of a first object, a second object, and a third object, and respective label information on correlations between first objects and second objects.

The present disclosure also provides an electronic device. The device includes: a processor; a memory for storing executable instructions of the processor; wherein the processor is configured to invoke the executable instructions stored in the memory to implement the method for predicting correlation between objects shown in any of the examples.

The present disclosure also provides a non-transitory computer-readable storage medium. The storage medium stores a computer program, and the computer program is configured to perform the method for predicting correlation between objects shown in any of the examples.

The present disclosure also provides a computer program product, including computer-executable instructions, wherein when the computer-executable instructions run in a processor of a device, the processor executes the method for predicting correlation between objects shown in any of the examples.

In the technical solution, when determining correlation between a first object and a second object, an image area corresponding to a joint bounding box surrounding the first object, the second object, and a body object is used to predict correlation between the first object and the second object, so as to introduce information of body object in the joint bounding box that is useful for determining the correlation between the first object and the second object, thereby improving the accuracy of predicting correlation.

It should be noted that the useful information contained in the joint bounding box can also include information of other parts besides the body object. For example, it includes but is not limited to: feature information corresponding to at least one of an elbow, a shoulder, an upper arm, and a forearm.

It should be understood that the general description and the following detailed description are only exemplary and explanatory, and cannot limit the present disclosure.

BRIEF DESCRIPTION OF THE DRAWINGS

In order to more clearly describe the technical solutions in one or more examples of the present disclosure or related technologies, accompanying drawings that to be used in the description of the examples or related technologies will be briefly introduced in the following. Apparently, the accompanying drawings in the following description are only some of the examples described in one or more embodiments of the present disclosure. For those of ordinary skill in the art, other drawings can be obtained based on these drawings without creative labour.

DETAILED DESCRIPTION OF THE EXAMPLES

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of devices and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein includes any or all possible combinations of one or more of the correlated listed items. It should also be understood that, depending on the context, the word "if" as used herein may be interpreted as "when" or "upon" or "in response to determining".

The present disclosure aims to provide a method for predicting correlation between objects. When determining correlation between a first object and a second object, an image area corresponding to a joint bounding box surrounding the first object, the second object, and a body object is used to predict correlation between the first object and the second object, so as to introduce information of body object in the joint bounding box that is useful for determining the correlation between the first object and the second object, thereby improving the accuracy of predicting correlation.

It should be noted that the useful information contained in the joint bounding box can also include information of other parts besides the body object. For example, it includes but is not limited to: respective feature information of at least one of an elbow, a shoulder, an upper arm, and a forearm.

Figure 1:
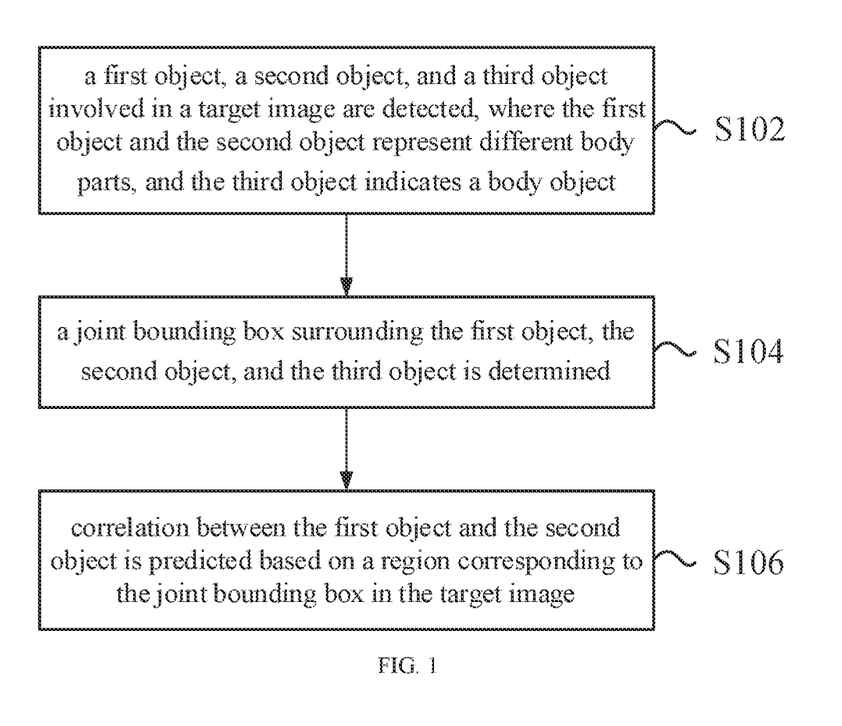
FIG. 1 is a flowchart illustrating a method for predicting correlation between objects according to the present disclosure.

Referring to FIG. 1, FIG. 1 is a flowchart illustrating a method for predicting correlation between objects according to the present disclosure. As shown in FIG. 1, the method can include the following steps.

At S102, a first object, a second object, and a third object involved in a target image are detected, where the first object and the second object represent different body parts, and the third object indicates a body object.

At S104, a joint bounding box surrounding the first object, the second object, and the third object is determined.

At S106, correlation between the first object and the second object is predicted based on a region corresponding to the joint bounding box in the target image.

The correlation prediction method can be applied to an electronic device. The electronic device can execute the method by installing a software system corresponding to the method. In examples of the present disclosure, the type of the electronic device can be a notebook computer, a computer, a server, a mobile phone, a PAD terminal, etc., which is not particularly limited in the present disclosure.

It is understandable that the method can be executed by either of a client device or a server device, or can be executed by both of the client device and the server device in cooperation.

For example, the method can be integrated in the client device. After the device receives a correlation prediction request, the device can execute the method through the computing power provided by hardware of the device.

For another example, the method can be integrated into a server device. After the device receives a correlation prediction request, the device can execute the method through the computing power provided by hardware of the device.

For another example, the method can be divided into two tasks: obtaining a target image and processing the target image. Here, the task of obtaining a target image can be performed by the client device, and the task of processing the target image can be performed by the server device. The client device can initiate a correlation prediction request to the server device after obtaining the target image. After receiving the correlation prediction request, the server device can execute the method on the target image in response to the request.

The following description will be given with reference to an example in which the execution entity is an electronic device (hereinafter referred to as the device).

The target image refers to an image that needs image processing to extract useful information. The target image can involve several to-be-detected objects. For example, in a tabletop game scenario, the target image can involve some persons around the tabletop, as well as face objects, hand objects, and body objects of the persons.

In some examples, the device can interact with the user to obtain the target image input by the user. For example, the device can provide a window for a user to input the target image to be processed through its equipped interface. Thus the user can complete the input of the target image based on this window.

In some examples, the device can also be connected to an image capture device deployed on-site in a to-be-captured scenario to obtain an image captured by the image capture device and take the image as a target image.

After obtaining the target image, the device can perform target detecting on the target image, to detect the first object, the second object, and the third object involved in the target image. The first object and the second object represent different body parts, and the third object indicates a body object.

Taking a tabletop game scenario as an example, the target image can be obtained from an image capture device deployed around or above the desktop. Then, target detection can be performed on the target image, to detect the face object, hand object, and body object involved in the target image.

In this step, the target image can be input into a target object detecting model for target detection. It should be understood that the result of target detection on the target image can include respective bounding boxes of the first object and the second object and respective position information of the bounding boxes. The position information of the bounding box can include coordinate of at least one of the vertexes, as well as length and width information of the bounding box.

The target object detecting model is used to perform target detection tasks. For example, the model can be a neural network built based on a RCNN (Region Convolutional Neural Network), a FAST-RCNN (Fast a Region Convolutional Neural Network) or a FASTER-RCNN (Faster Region Convolutional Neural Network).

In practice, before using the target object detecting model for target detection, the model can be trained based on some training samples with position label information of the first object and the second object until the model converges.

Figure 2:
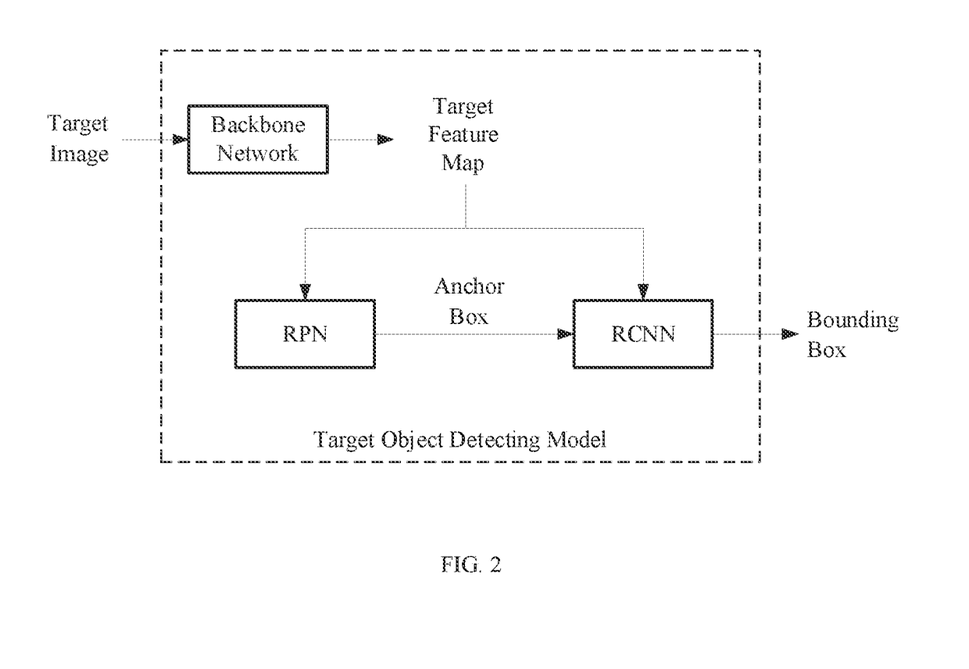
FIG. 2 is a flowchart illustrating a target detection method for detecting a first object, a second object, and a third object involved in a target image according to the present disclosure.

Referring to FIG. 2, FIG. 2 is a flowchart illustrating a target detection method for detecting a first object, a second object, and a third object involved in a target image according to the present disclosure. It should be noted that FIG. 2 only schematically illustrates the process of the target detection method, and does not limit the present disclosure.

As shown in FIG. 2, the target object detecting model can be a FASTER-RCNN model. The model can include at least Backbone (a backbone network), RPN (Region Proposal Network, a candidate box generating network), and RCNN (Region-based Convolutional Neural Network).

Here, the backbone network can perform some convolution operations on the target image to obtain a target feature map of the target image. Then, the target feature map can be input into the RPN network to obtain anchors (anchor boxes) respectively corresponding to each target object involved in the target image. After that, the anchor box and the target feature map can be input into the corresponding RCNN network for bbox (bounding boxes) regression and classification to obtain respective bounding boxes surrounding the first object, the second object, and the third object involved in the target image.

It should be noted that in the examples of the present disclosure, a same target object detecting model can be used to detect two different types of body part objects and body object, if categories and positions of a first body part object, a second body part object, and a body object involved in sample images are respectively marked in the training. When the target detection task is performed, the target object detecting model can output respective detection results of different types of body part objects and the body objects.

After determining the respective bounding boxes of the first object, the second object, and the third object, S104 can be performed to determine a joint bounding box surrounding the first object, the second object, and the third object.

The joint bounding box refers to an surrounding box surrounding the bounding box of the first object, the bounding box of the second object, and the bounding box of the third object, or an surrounding box that is connected with one or more of the bounding box of the first object, the bounding box of the second object, and the bounding box of the third object, as well as surrounds the first object, the second object and the third object. It should be noted that the shape of the joint bounding box can be a circle, an ellipse, a rectangle, etc., which is not particularly limited here. The following description takes that the shape of the joint bounding box is a rectangle as an example.

Figure 3:
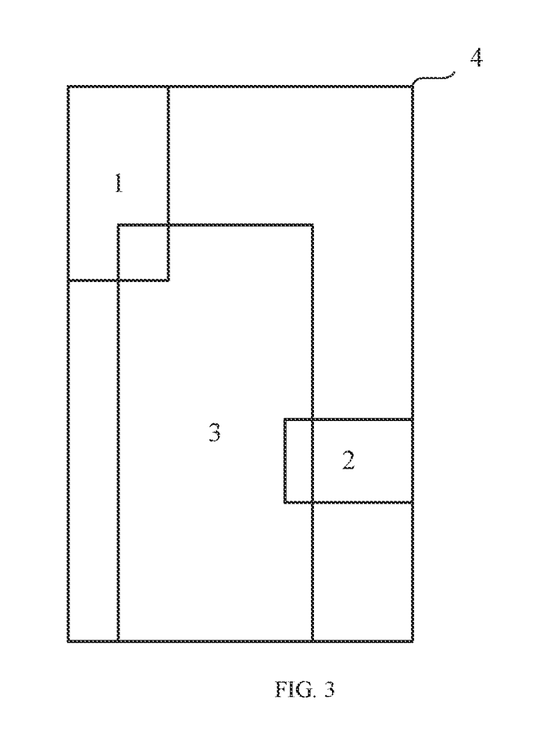
FIG. 3 is a schematic diagram of a joint bounding box according to the present disclosure.

Referring to FIG. 3, FIG. 3 is a schematic diagram of a joint bounding box according to the present disclosure.

In the target image shown in FIG. 3, the bounding box of the first object is box 1; the bounding box of the second object is box 2; the bounding box of the third object is box 3. The joint bounding box surrounding the first object, the second object, and the third object is box 4.

In some examples, the bounding box is a rectangle, and position features of 12 vertices corresponding to the bounding box of the first object, the bounding box of the second object, and the bounding box of the third object can be extracted, for example, the position coordinates of each vertex can be obtained. Then, extreme values for the abscissa and ordinate can be determined from the position coordinates of the 12 vertices. If X is used to represent the abscissa and Y is used to represent the ordinate, the minimum and maximum values of the abscissa can be represented as $X_{min}$ and $X_{max}$, respectively, and the minimum and maximum values of the ordinate can be represented as $Y_{min}$ and $Y_{max}$, respectively. After that, the minimum value of the abscissa and the maximum value of the abscissa are respectively combined with the maximum value of the ordinate and the minimum value of the ordinate to obtain 4 vertex coordinates for the externally-connected box of the first bounding box and the second bounding box, namely $(X_{min}, Y_{min})$, $(X_{min}, Y_{max})$, $(X_{max}, Y_{min})$, $(X_{max}, Y_{max})$. Then, based on a preset distance D between a joint bounding box and an externally-connected box, the position coordinates corresponding to the four vertices of the joint bounding box are determined. For example, the position coordinates corresponding to the 4 vertices of the joint bounding box can be $(X_{min}-D, Y_{min}-D)$, $(X_{min}-D, Y_{max}+D)$, $(X_{max}+D, Y_{min}-D)$, $(X_{max}+D, Y_{max}+D)$. After determining the position coordinates corresponding to the four vertices, the rectangular box determined by the four vertices can be determined as the joint bounding box.

In some examples, when performing S104, a first surrounding box surrounding the first object and the second object can be determined based on respective detection results of the first object and the second object, and then the joint bounding box surrounding the first object, the second object, and the third object can be generated based on the first surrounding box and a detection result of the third object.

In practice, in a case where the first object indicates a face object and the second object indicates a hand object, according to the coordinates of the eight vertices corresponding to the bounding box of the face object and the bounding box of the hand object, a first surrounding box is determined by using the method for determining an externally-connected box. Then, based on a similar method, a joint bounding box surrounding the first surrounding box and a bounding box of the body object is determined.

In an actual scene, although a hand object and a face object are included in a body object, when detecting the three different types of objects, due to the difference in prediction strategies on the boundary of the three types of objects, the detected bounding box of the body does not necessarily contain the hand bounding box and the face bounding box, for example, the bounding box of a face can partially overlap the bounding box of a body. In the examples of the present disclosure, in order to reduce affection of the accuracy for the detected bounding boxes on the correlation prediction result, first, an surrounding box surrounding the first object and the second object can be calculated, then, a joint bounding box surrounding the first object, the second object, and the third object can be determined based on the surrounding box and the bounding box of the third object, thus the joint bounding box surrounding the face object, the hand object, and the body object can be accurately determined, and reduce the lack of key information for body related to a hand and a face in predicting the correlation between the hand and the hand.

In some examples, S1042 can be performed first, in which each of one or more detected first objects are combined with the each of one or more detected second objects to obtain one or more object pairs. Then, for each of the object pairs, a first surrounding box surrounding the object pair can be determined.

For example, it is assumed that a target image involves 3 first objects and 3 second objects. In this case, 9 object pairs can be determined, and each pair containing a first object and a second object. Then, each object pair can be used as a current object pair in turn, and a first surrounding box surrounding the bounding box of the first object and the bounding box of the second object in the current object pair can be determined.

In some examples, the first surrounding box indicates one of surrounding boxes surrounding the first object and the second object of which area is smallest.

For example, in a tabletop game scenario, the first surrounding box indicates one of the surrounding boxes surrounding the face object and the hand object of which area is smallest. Therefore, on the one hand, the area of the first surrounding box can be controlled, thereby controlling the computational load of the model; on the other hand, it can reduce useless information for correlation prediction introduced in the first surrounding box, thereby affecting the accuracy of predicting correlation.

After determining the first surrounding box corresponding to each combination result, S1044 can be performed, in which for each of the object pairs, one or more ternary object sets are obtained by combining the object pair with each of one or more third objects. Then, for each of the ternary object sets, according to the first surrounding box of the object pair and a detection result of the third object in the ternary object set, a joint bounding box surrounding the ternary object set can be generated.

It is possible to first combine the face object and the hand object involved in the target image to obtain a combined pair, and then determine a first surrounding box of the combined pair. After that, each of the combined pairs are combined with the bodys involved in the target image, to obtain one or more ternary object sets, where each ternary object set includes one first object, one second object and one third object. Then, a joint bounding box is determined. This method can traverse ternary object sets of any face object, any hand object, and any body object detected from the target image, and determine a joint bounding box of each multi-objects set without omission. Furthermore, in the subsequent step of correlation detection, it is possible to traverse the combination of any face object and any hand object detected from the target image, and completely detect the face object and the hand object that are correlated involved in the image.

In some examples, in order to remove invalid combination results so as to reduce invalid calculations and improve correlation prediction efficiency, when based on the first surrounding box and a detection result of the third object, generating the joint bounding box surrounding the first object, the second object, and the third object, the following steps can be performed.

In the first step, one from a bounding box of a respective detected third object is selected as a target bounding box corresponding to the first surrounding box, in a way that an overlapping area between the selected bounding box and the first surrounding box is largest.

During this step, an overlapping area between a detected bounding box of a third object with the first surrounding box can be calculated according to position features of the detected bounding box of the third object and position features of the first surrounding box. Then, according to the calculated overlapping area, the bounding boxes of the third objects are sorted, and the bounding box of the third object with the largest overlapping area is determined as the target bounding box corresponding to the first surrounding box.

In some examples, an IoU (Intersection over Union) algorithm can also be used to select one from respective detected bounding box of the third objects as the target bounding box in a way that an IoU value between the selected bounding box and the first surrounding box is largest.

Specifically, for each of the bounding boxes of the third objects, a respective overlapping area between the first surrounding box with the bounding box of the third object can be determined. Then, a respective union range between the first surrounding box with the bounding box of the third object is determined. Then, based on the IoU algorithm formula, a respective IoU value corresponding to the first surrounding box and the bounding box of the third object is obtained. Then, the bounding boxes of the third objects are sorted according to the calculated IoU values, and the third object bounding box with the largest IoU value is determined as the target bounding box corresponding to the first surrounding box.

In the second step, based on the first surrounding box and the target bounding box, the joint bounding box surrounding the first object, the second object, and the third object is generated.

In some examples, the joint bounding box can indicate an externally-connected joint bounding box which is externally connected with the first surrounding box and/or the bounding box of the third object. In this way, the area of the joint bounding box can be controlled, thereby controlling the amount of calculation; on the other hand, using a externally-connected box can reduce the introduction of useless information and improve the accuracy of the correlation prediction result.

In the method, instead of randomly combining all face objects, hand objects, and body objects involved in the target image, but the face object, the hand object and the body object that might belong to a same person are combined, thereby reducing the number of ternary object set, invalid operations, and improving the efficiency of predicting correlation.

After the respective joint bounding box corresponding to the object pairs is determined, S106 can be performed to predict correlation between the first object and the second object based on the area corresponding to the joint bounding box in the target image.

The correlation prediction refers to determining a confidence regarding that the first object and the second object detected involved in the target image belong to one same body object. In some examples, the correlation prediction can be performed with a correlation predicting model constructed based on a neural network, to obtain the confidence indicating that the first object and the second object belong to one same body object.

In some examples, the confidence can be quantified based on a prediction score. The higher the prediction score is, the higher the probability that the two parts belong to one same body.

The correlation predicting model can be a regression model or a classification model constructed based on a region feature extracting unit. The predicting model can comprise a fully connected layer, and finally output a correlation prediction score.

Here, the fully connected layer can be a calculating unit constructed based on algorithms such as linear regression and least squares regression. The calculating unit can perform feature mapping on the region features to obtain the corresponding correlation prediction score value.

In practice, the calculating unit can be trained based on several training samples with respective label information on correlations of first objects and second objects.

When constructing training samples, several original images can be first obtained, each of the first objects and each of the second objects involved in the original images are randomly combined with an annotation tool, to obtain a plurality of combinations, and then correlation between the first object and the second object in each combination is labeled. If a face object is correlated to the hand object in the same combination (belonging to the same person), it can be labeled with 1, otherwise it can be labeled with 0. Alternatively, when labeling an original image, information of a person object (such as a person ID) to which a face object or a hand object involved in the original image belongs can be labeled. Thus, it can be determined whether a face object is correlated to the hand object in the same combination according to whether the respective information of the person objects is consistent.

Figure 4:
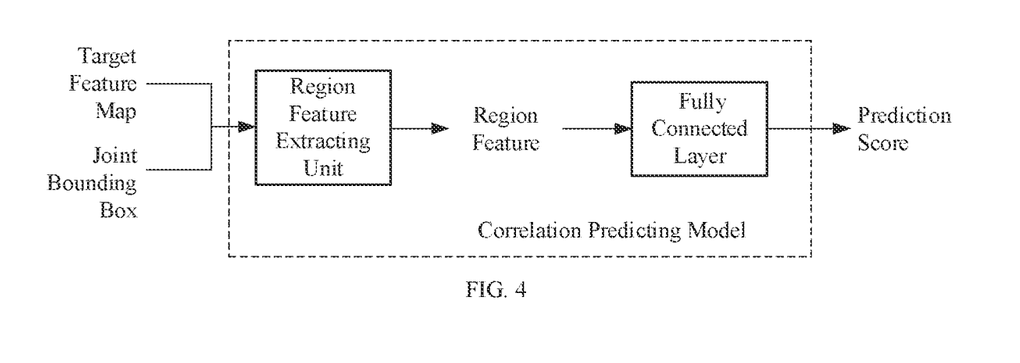
FIG. 4 is a flowchart of a method for predicting correlation between a first object and a second object according to the present disclosure.

Referring to FIG. 4, FIG. 4 is a flowchart of a method for predicting correlation between a first object and a second object according to the present disclosure.

As an example, the correlation predicting model shown in FIG. 4 can include a region feature extracting unit and a fully connected layer.

The region feature extracting unit can obtain region features based on a joint bounding box and a target feature map corresponding to the target image.

For example, the region feature extracting unit can be a RoI Align (Region of interest Align) unit or a RoI pooling (Region of interest pooling) unit.

The fully connected layer can be a unit constructed based on algorithms such as linear regression and least squares regression. This unit can perform feature mapping (matrix operation) on the region features (pixel matrix) to obtain a corresponding correlation prediction score value.

When performing this step, the joint bounding box and the target feature map corresponding to the target image can be input to the region feature extracting unit to obtain region features of the joint bounding box.

Then, the region features of the joint bounding box are input into the fully connected layer for calculation to obtain a correlation prediction score.

Since the joint bounding box involves not only related information of the face object and the hand object, but also related information of a body, a neck, an elbow, a shoulder, an upper arm, a forearm and other body parts located between the face and the hand. Thus when predicting correlation between the hand object and the face object based on the region features corresponding to the joint bounding box, information which is useful for determining correlation between the face object and the hand object can be introduced, thereby improving the accuracy of predicting correlation.

In some examples, in order to improve the accuracy of predicting correlation, when performing S106, information such as the feature of the first object and the feature of the second object which is useful for correlation prediction of the first object and the second object can be combined to improve the accuracy of predicting correlation.

In practice, correlation between the first object and the second object can be predicted based on the region features corresponding to the joint bounding box, and the region features and/or position features respectively corresponding to the first objects and second objects involved in the joint bounding box.

It should be understood that the above steps actually include three solutions. The solution of predicting correlation between the first object and the second object based on the region features corresponding to the joint bounding box, and the respective region features and position features of the first object and the second object involved in the combined result corresponding to the joint bounding box will be described in detail below.

Figure 5:
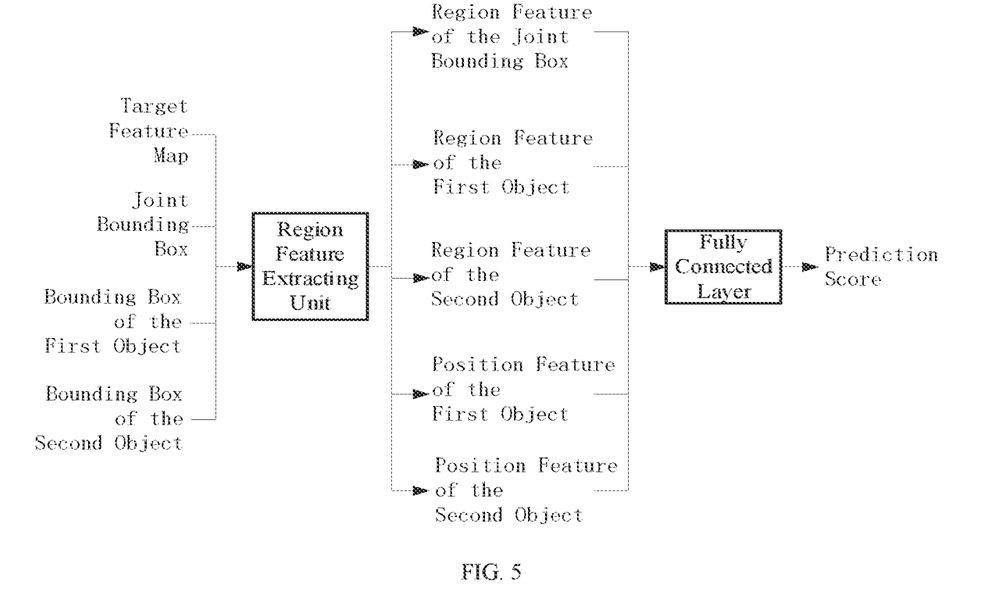
FIG. 5 is a flowchart of a specific implementation for predicting the correlation between a first object and a second object according to the present disclosure.

Referring to FIG. 5, FIG. 5 is a flowchart of a specific implementation for predicting the correlation between a first object and a second object according to the present disclosure.

As an example, the correlation predicting model shown in FIG. 5 can include a region feature extracting unit and a fully connected layer.

As shown in FIG. 5, after S102-S104 are performed to obtain the joint bounding box, the joint bounding box, the bounding boxes of the first object and the second object surrounded by the joint bounding box can be input into the region feature extracting unit respectively, to obtain respective region features of the joint bounding box, the first object and the second object surrounded by the joint bounding box.

Then, feature splicing can be performed on the region features of the joint bounding box, the respective region features of the first object and the second object surrounded by the joint bounding box, and the respective positions features of the first object and the second object surrounded by the joint bounding box, to obtain a spliced feature of a preset length.

Finally, the spliced feature can be input into the fully connected layer for correlation prediction, to obtain a correlation prediction score between the first object and the second object.

In the implementation, in addition to introducing the information included in the region features corresponding to the joint bounding box, the respective region features and position features of the face object and the hand object that are useful for correlation predicting are also introduced, thereby further improving the accuracy of predicting correlation.

In some examples, correlated objects involved in the target image can also be predicted. Where first based on the method for predicting correlation between objects shown in any of the above examples, to predict correlations between first objects and second objects involved in a target image. Then, based on the prediction result of the correlations between, the first objects and, the second objects, the correlated objects involved in the target image can be determined.

If the target image only involves one pair of a first object and a second object, it can be determined whether the correlation prediction score between the first object and the second object reaches a preset score threshold. If the correlation prediction score reaches the preset score threshold, it can be determined that the first object and the second object are the correlated objects involved in the target image. Otherwise, it can be determined that the first object and the second object are not correlated objects.

The preset score threshold is an empirical threshold that can be set according to actual situations. For example, the preset score threshold can be 0.95.

If a target image involves a plurality of first objects and second objects, when determining correlated objects involved in the target image, each detected first object and each detected second object can be combined to obtain a plurality of object pairs. Then, respective first surrounding boxes of the plurality of object pairs can be determined. After that, for each object pair, one from the a bounding box of a respective detected third objects is selected as a target bounding box, in a way that an overlapping area between the selected bounding box and the first surrounding box of the object pair is largest, and based on the first surrounding box of the object pair and the target bounding box, the joint bounding box surrounding the object pair and the third object can be generated.

After the respective joint bounding boxes of the plurality of object pairs are determined, correlation prediction results corresponding to the plurality of object pairs can be determined based on the respective region features for the joint bounding boxes of the plurality of object pairs. The correlation prediction result includes a correlation prediction score.

Specifically, for each object pair, the region features of the joint bounding box corresponding to the object pair, as well as the respective region features and position features of the first and second objects in the object pair, can be input into the correlation predicting model to obtain the corresponding correlation prediction score of the object pair. It can be understood that a correlation prediction score corresponding to an object pair indicates the correlation prediction score between the first object and the second object in the object pair.

In practice, usually one face object can only correspond to two hand objects at most and one hand object can only correspond to one face object at most.

In some examples, each from the plurality of object pairs can be determined as a current object pair, in an order of the respective correlation prediction scores of the object pairs from high to low, and the following first and second steps can be performed.

In the first step, based on the determined correlated objects, it is determined whether the minder of second objects that are correlated with the first object in the current object pair reaches a first preset threshold, and it is determined whether the number of first objects that are correlated with the second object in the current object pair reaches a second preset threshold.

The first preset threshold is an empirical threshold that can be set according to actual situations. Here, the first object indicates a face object, and the second object indicates a hand object. The first preset threshold can be 2.

The second preset threshold is an empirical threshold that can be set according to actual situations. Here, the first object indicates a face object, the second object indicates a hand object, and the second preset threshold can be 1.

In some examples, a combination with a correlation prediction score reaching a preset score threshold can be determined as current object pair, according to an order of the respective correlation prediction scores from high to low.

In the examples of the present disclosure, a combination with a correlation prediction score reaching a preset score threshold can be determined as current object pair, and correlation determination is performed on the current object pair, thereby improving the accuracy of the correlation prediction result.

In some examples, a counter can be maintained for each first object and each second object. For any first object, if a second object is determined as being correlated with the first object, the value of the counter corresponding to the first object is increased by 1. In this case, two counters can be used to determine whether the number of second objects that are correlated with the first object reaches the first preset threshold, and to determine whether the number of first objects that are correlated with the second object reaches the second preset threshold.

In the second step, in response to that the number of second objects that are correlated with the first object in the current object pair is lower than the first preset threshold, and the number of first objects that are correlated with the second object in the current object pair is lower than the second preset threshold, the first object and the second object in the current object pair are determined as correlated objects involved in the target image.

In the above solutions, in complex scenarios (for example, the target image involve a plurality of persons with overlapping faces, limbs, and hands), it can avoid unreasonable prediction such as predicting that one face object is predicted as being correlated with more than two hand objects or that one hand object is predicted as being correlated with more than one face object. For example, in a multiplayer tabletop game scenario, where hands or faces of different people may overlap or shield each other, the solutions can correlate hands with respective faces with a higher accuracy.

In some examples, the detection result of the correlated objects involved in the target image can be output.

For example, in a tabletop game scenario, a bounding box corresponding to the face object and the hand object indicated as the correlated objects can be output on an image output device (such as a display). By outputting the detection result of the correlated objects on the image output device, an observer can conveniently and intuitively determine the correlated objects involved in the target image displayed on the image output device, thereby facilitating further manual verification on the detection result of the correlated objects.

The following will describe an example in a tabletop game scenario. It should be understood that for implementation in other scenarios, reference can be made to the description of the tabletop game scenario example in the present disclosure, which is not described in detail here.

In a tabletop game scenario, a game table is usually provided, and game participants surround the game table. An image capture device for capturing live images of a tabletop game can be deployed in the tabletop game scenario. The live image can involve the faces, hands, and bodies of the game participants. In this scenario, it is expected to determine the hand and face that are correlated objects involved in the live image, so that the personal identity information to which the hand belongs can be determined based on the face correlated with the hand involved in the image.

Here, the hand and the face are correlated objects, or the hand and the face are correlated, which means that the two belong to the same body, that is, the two are the hand and the face of the same person.

In this scenario, a detection device for detecting correlation between a face and a hand can also be deployed. The device can obtain live images from the image capture device and determine the correlated objects involved in the live images.

The electronic device can be equipped with a trained face-hand-body-object detecting network and a face-hand correlation predicting network.

The face-hand-body-object detecting network can be a neural network constructed based on the FSTER-RCNN network. The network can detect face objects, hand objects, and body objects from live images.

The face-hand correlation predicting network can be a neural network constructed based on a region feature extracting unit and a fully connected layer. The network can extract region features of the joint bounding box involving the face object, the hand object, and the body object, and combine the extracted region features with respective region features and position features of the face object and the hand object in the joint bounding box to determine a correlation prediction score between the face object and the hand object.

In the examples of the present disclosure, the electronic device can obtain live images from the image capture device in response to a user's operation or periodically.

Then, the object detecting network can be used to detect the face objects, the hand objects, and the body objects involved in the live image.

Then, any of the detected face objects and any of the detected hand objects can be combined to obtain a plurality of object pairs, and the first surrounding boxes of the plurality of object pairs can be respectively determined. The first surrounding box is one of the rectangular boxes surrounding the object pairs of which area is smallest, so the amount of calculation can be reduced.

After that, for each object pair, from the detected bounding boxes of the body objects, a bounding box is selected as the target bounding box, in a way that an overlapping area between the selected bounding box and the first surrounding box of the object pair is largest, and based on the first surrounding box of the object pair and the target bounding box, a joint bounding box surrounding the object pair and the body object can be generated. Where the joint bounding box is a externally-connected box of the first surrounding box and the target bounding box, so the amount of calculation can be reduced. It should be noted that the specific steps for determining the joint bounding box can refer to the foregoing content, which is not described in detail here.

Further, for each of the plurality of object pairs, region features corresponding to the joint bounding box of the object pair, as well as respective region features and position features of the face object and the hand object in the object pair can be input into the hand-face correlation predicting network, to obtain a correlation prediction score corresponding to the object pair.

Since the joint bounding box involves not only the face part and the hand part, but also the body, neck, elbow, shoulder, upper arm, forearm and other body parts, it is possible to introduce information which is useful for determining correlation between the face object and the hand object, thereby improving the accuracy of predicting correlation.

In the detection device, a counter can also be maintained for each face object and each hand object. For any face object, if one hand object is determined as being correlated with the face object, the value of the counter corresponding to the face object is increased by 1. In this case, two counters can be used to determine whether the number of hand objects that are correlated with the face object reaches the first preset threshold, and to determine whether the number of face objects that are correlated with the hand object in the current object pair reaches the second preset threshold.

Further, it is possible to select each from the plurality of object pairs as the current object pair, in an order of the respective correlation prediction scores of the object pairs from high to low, and perform the following steps:

Obtaining a first value from the counter corresponding to the face object in the current object pair, and determining whether the first value reaches 2, and obtaining a second value from the counter corresponding to the hand object in the current object pair, and determining whether the second value reaches 1.

If the first value is lower than 2 and the second value is lower than 1, it means that the number of hand object that correlated with the face object is less than 2, and the number of face object that correlated with the hand object is less than 1. Therefore, the face object and the hand object in the current object pair can be determined as the correlated objects involved in the live image.

In the above solutions, in complex scenarios (for example, the target image involves a plurality of people with overlapping faces, limbs, and hands), unreasonable prediction such as that one face object is predicted as being correlated with more than two hand objects or that one hand object is predicted as being correlated with more than one face object can be avoided.

The electronic device is also equipped with a display unit.

The display unit can output a bounding box corresponding to the face object and the hand object indicated as correlated objects on the display mounted on the electronic device. By outputting the detection result of the correlated objects on the display, the observer can conveniently and intuitively determine the correlated objects involved in the live image displayed on the image output device, thereby facilitating further manual verification on the detection result of the correlated objects.

The electronic device can also obtain live images in real time, and determine the correlated hand objects and face objects from the live images.

The electronic device can also recognize the action being performed or the area being touched by the hand object involved in the live image. If the electronic device recognizes that the hand object performs actions such as fetching/ releasing game props, or touching a preset game area, it can determine the personal identity of the relevant person based on the face object correlated with the hand object. After that, the identity of the determined person can be output to facilitate the management of the tabletop game manager.

The solution of determining correlated objects involved in the target image according to the present disclosure has been described above. In the following, a method for training a target object detecting model and a correlation predicting model used in the solution will be described.

The target object detecting model and the correlation predicting model can share the same backbone network.

In the present disclosure, in order to improve the accuracy of the determination results of correlated first object and second object, each model can be trained in stages. The first stage is the training of the target object detecting model; the second stage is the joint training of the models.

Figure 6:
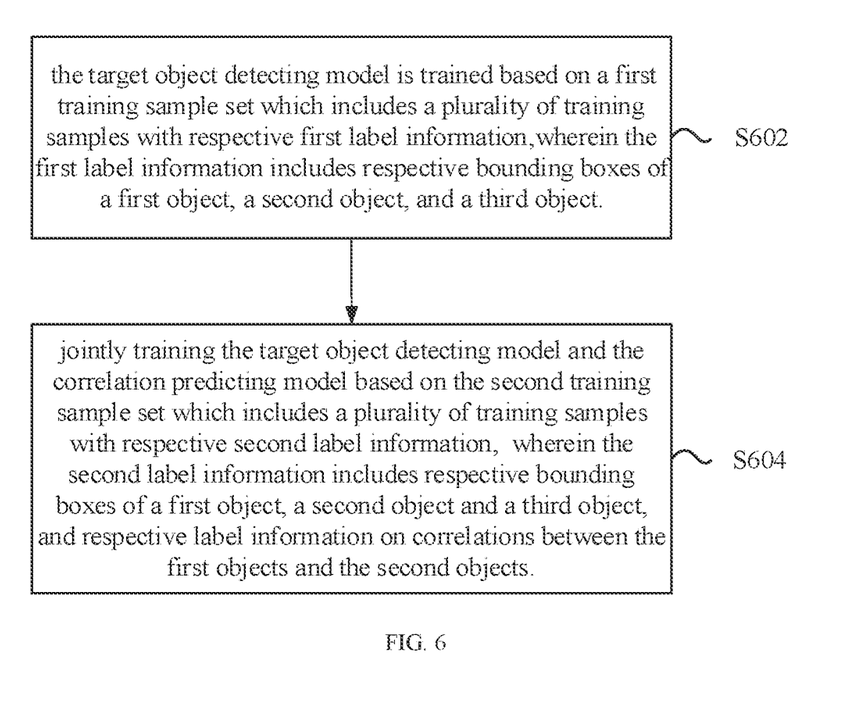
FIG. 6 is a flowchart of a method for training a model according to the present disclosure.

Referring to FIG. 6, FIG. 6 is a flowchart of a method for training a model according to the present disclosure.

As shown in FIG. 6, the method includes the following steps.

At S602, the target object detecting model is trained based on a first training sample set which includes a plurality of training samples with respective first label information; wherein the first label information includes respective bounding boxes of a first object, a second object, and a third object.

At this step, the original image can be labeled with a true or false value by manual labeling or machine-aided labeling. For example, in a tabletop game scenario, after obtaining the original image, an image annotation tool can be used to annotate the bounding box of the face object, the bounding box of the hand object, and the bounding box of the body object involved in the original image to obtain several training samples. It should be noted that when encoding the training samples, one-hot encoding and other methods can be used for encoding, and the specific encoding method is not limited in the present disclosure.

After that, the target object detecting model can be trained based on a preset loss function until the model converges.

After the target object detecting model converges, S604 can be performed to jointly training the target object detecting model and the correlation predicting model based on the second training sample set which includes a plurality of training samples with respective second label information; wherein the second label information includes respective bounding boxes of a first object, a second object and a third object, and respective label information on correlations between the first objects and the second objects.

The original image can be labeled with a true or false value by manual labeling or machine-aided labeling. For example, after obtaining the original image, an image annotation tool can be used to annotate the bounding box of the face object and the bounding box of the hand object involved in the original image. On the other hand, the image annotation tool can be used to randomly combine each of the face objects with each of the hand objects involved in the original image to obtain a plurality of combined results. Then, correlation labeling is performed for the face object and hand object in each combination to obtain the label information on correlations. In some examples, if the face object and the hand object in one body part combination are correlated objects (belonging to the same person), then 1 is labeled; otherwise, 0 is labeled.

After the second training sample set is determined, a joint learning loss function can be determined based on the loss functions respectively corresponding to the target predicting model and the correlation predicting model.

In some examples, a sum of or a weighted sum of the loss functions respectively corresponding to the target predicting model and the correlation predicting model can be obtained to obtain the joint learning loss function.

It should be noted that, in the present disclosure, a hyper parameter such as regularization items can also be added to the joint learning loss function. The type of hyper parameter added is not particularly limited here.

After that, the target object detecting model and the correlation predicting model can be jointly trained based on the joint learning loss function and the second training sample set until the target object detecting model and the correlation predicting model converge.

Since the supervised joint training method is used in the model training, the target object detecting model and the correlation predicting model can be trained simultaneously, so that the target object detecting model and the correlation predicting model can restrict and promote each other in the training process. It can improve the convergence efficiency of the two models on the one hand; on the other hand, promote the backbone network shared by the two models to extract more useful features for predicting correlation, thereby improving the accuracy of predicting correlation.

Figure 7:
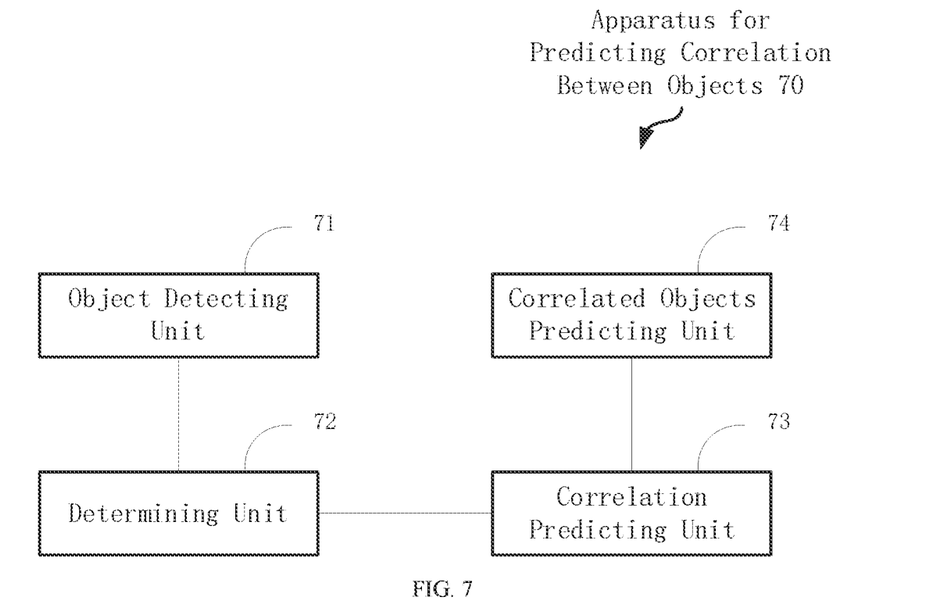
FIG. 7 is a block diagram of an apparatus for predicting correlation between objects according to the present disclosure.

Corresponding to any of the examples, the present disclosure also provides an apparatus for predicting correlation between objects. Referring to FIG. 7, FIG. 7 is a block diagram of an apparatus for predicting correlation between objects according to the present disclosure.

As shown in FIG. 7, the apparatus 70 can include: an object detecting unit 71 configured to detect a first object, a second object, and a third object involved in a target image, where the first object and the second object represent different body parts, and the third object indicates a body object; a determining unit 72 configured to determine a joint bounding box surrounding the first object, the second object, and the third object; a correlation predicting unit 73 configured to predict correlation between the first object and the second object based on a region corresponding to the joint bounding box in the target image.

In some examples, the determining unit 72 includes: a determining sub-unit configured to determine a first surrounding box surrounding the first object and the second object based on respective detection results of the first object and the second object; a generating unit configured to generate the joint bounding box surrounding the first object, the second object, and the third object based on the first surrounding box and a detection result of the third object.

In some examples, the determining sub-unit is configured to: obtain one or more object pairs by combining each of one or more detected first objects with each of one or more detected second objects; for each of the object pairs, determine a first surrounding box surrounding the object pair; and/or, the generating unit is configured to: for each of the object pairs, obtain one or more ternary object sets by combining the object pair with each of one or more third objects, wherein the object pairs are obtained by combining each detected first object with each detected second object; and for each of the ternary object pairs, generate a joint bounding box surrounding the ternary object set based on the first surrounding box of the object pair and a detection result of the third object in the ternary object set.

In some examples, the detection result includes a bounding box; and the generating unit is configured to: select one from a bounding box of a respective detected third objects as a target bounding box corresponding to the first surrounding box, in a way that an overlapping area between the selected bounding box and the first surrounding box is largest; and generate the joint bounding box surrounding the first object, the second object, and the third object based on the first surrounding box and the target bounding box.

In some examples, the first surrounding box indicates one of bounding boxes surrounding the first object and the second object of which area is smallest, and/or, the joint bounding box indicates an externally-connected joint bounding box which is externally connected with the first surrounding box.

In some examples, the joint bounding box indicates an externally-connected joint bounding box which is externally connected with the bounding box of the third object; or the joint bounding box indicates an externally-connected joint bounding box which is externally connected with the first surrounding box and the bounding box of the third object.

In some examples, the correlation predicting unit 73 includes: an input unit configured to obtain region features of the joint bounding box, and respective region features of the first object and the second object surrounded by the joint bounding box by, inputting the joint bounding box and respective bounding boxes of the first object and the second object surrounded by the joint bounding box into a region feature extraction unit; a feature splicing unit configured to obtain a spliced feature of a preset length by splicing the region features of the joint bounding box, the respective region features of the first object and the second object surrounded by the joint bounding box, and respective positions features of the first object and the second object enclosed by the joint bounding box; a predicting sub-unit configured to predict correlation between the first object and the second object based on the spliced feature.

In some examples, the apparatus 70 further includes: a correlated objects predicting unit 74 configured to determine correlated objects involved in the target image based on a prediction result of the correlation between the first object and the second object.

In some of the examples, the correlation prediction result includes a correlation prediction score, and the correlation object predicting unit 74 is configured to: select each from a plurality of object pairs as a current object pair, in an order of respective correlation prediction scores of the object pairs from high to low, wherein the plurality of object pairs are obtained by combining each detected first object with each detected second object, and perform: for the current object pair, based on determined correlated objects involved in the target image, determining a number of second objects that are correlated with the first object in the current object pair as a first number, and determining a number of first objects that are correlated with the second object in the current object pair as a second number; in response to that the first number is lower than a first preset threshold, and the second number is lower than a second preset threshold, determine the first object and the second object in the current object pair as correlated objects involved in the target image.

In some examples, the apparatus 70 further includes: an output unit configured to output a detection result of the correlated objects involved in the target image.

In some examples, the correlation between the first object and the second object includes: a confidence regarding that the first object and the second object belong to one same body object.

In some examples, the first object includes a face object; the second object includes a hand object.

In some examples, the object detecting unit 71 is configured to: detect the first object, the second object, and the third object involved in the target image with a target object detecting model. The correlation predicting unit 73 is configured to: predict the correlation between the first object and the second object based on the region corresponding to the joint bounding box in the target image with a correlation predicting model; wherein the target object detecting model and the correlation predicting model are trained by: training the target object detecting model based on a first training sample set which includes a plurality of training samples with respective first label information; wherein the first label information includes respective bounding boxes of a first object, a second object, and a third object; and jointly training the target object detecting model and the correlation predicting model based on a second training sample set which contains a plurality of training samples with respective second label information; wherein the second label information includes respective bounding boxes of a first object, a second object, and a third object, and respective label information on correlations between first objects and second objects.

The examples of the apparatus for predicting correlation between objects according to the present disclosure can be used in an electronic device. Correspondingly, the present disclosure discloses an electronic device, which can include a processor; a memory configured to store processor executable instructions. The processor is configured to invoke the executable instructions stored in the memory to implement the method for predicting correlation between objects as shown in any of the examples.

Figure 8:
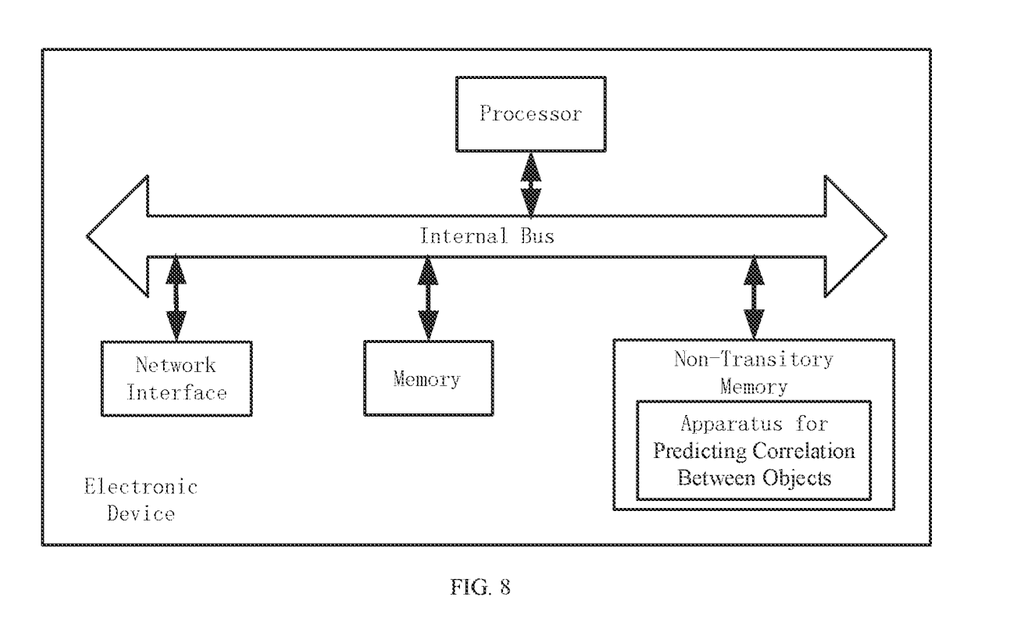
FIG. 8 is a block diagram of hardware of an electronic device according to the present disclosure.

Referring to FIG. 8, FIG. 8 is a block diagram of hardware of an electronic device according to the present disclosure.

As shown in FIG. 8, the electronic device can include a processor for executing instructions, a network interface for network connection, a memory for storing operating data for the processor, and a non-transitory memory for storing instructions corresponding to the apparatus for predicting correlation between objects.

The examples of the apparatus for predicting correlation between objects can be implemented by software, or can be implemented by hardware or a combination of software and hardware. Taking software implementation as an example, as a logical device, it is formed by reading the corresponding computer program instructions in the non-transitory memory into the memory through the processor of the electronic device where it is located. From a hardware perspective, in addition to the processor, memory, network interface, and non-transitory memory shown in FIG. 8, the electronic device in which the device is located in the example usually includes other hardware based on the actual functions of the electronic device, which will not be elaborated here.

It should be understood that, in order to improve the processing speed, the corresponding instructions of the apparatus for predicting correlation between objects can also be directly stored in the memory, which is not limited here.

The present disclosure provides a computer-readable storage medium, the storage medium stores a computer program, and the computer program is configured to perform any method for predicting correlation between objects in the first aspect.

The present disclosure also provides a computer program product, including computer-executable instructions, wherein when the computer-executable instructions run in a processor of a device, the processor executes the method for predicting correlation between objects in the first aspect.

Those skilled in the art should understand that one or more examples of the present disclosure can be provided as a method, a system, or a computer program product. Therefore, one or more examples of the present disclosure can adopt the form of a complete hardware example, a complete software example, or an example combining software and hardware. Moreover, one or more examples of the present disclosure can be in a form of a computer program product having one or more computer-usable storage media (which can include but not limited to disk storage, CD-ROM, optical storage, etc.) containing computer-usable program codes.

In the present disclosure, "and/or" means having at least one of the two. For example, "A and/or B" can include three schemes: A, B, and "A and B".

The various examples in the present disclosure are described in a progressive manner, and the same or similar pails between the various examples can be referred to each other, and each example focuses on the differences from other examples. In particular, as for the data processing device example, since it is basically similar to the method example, the description is relatively simple, and for related parts, reference can be made to the part of the description of the method example.

The above has described specific examples of the present disclosure. Other examples are within the scope of the appended claims. In some cases, the actions or steps described in the claims can be performed in a different order than in the examples and still achieve desired results. In addition, the processes depicted in the drawings do not necessarily require the specific order or sequential order shown to achieve the desired result. In some examples, multitasking and parallel processing are also possible or can be advantageous.

The examples of the subject and functional operations described in the present disclosure can be implemented in the following: digital electronic circuits, tangible computer software or firmware, computer hardware that can include the structures disclosed in the present disclosure and their structural equivalents, or one or more of them. The examples of the subject matter described in the present disclosure can be implemented as one or more computer programs, that is, one or more modules in the computer program instructions that are encoded in the tangible non-transitory program carrier to be executed by the data processing device or to control the operation of the data processing device. Alternatively or in addition, the program instructions can be encoded in artificially generated propagated signals, such as machine-generated electrical, optical, or electromagnetic signals, which are generated to encode information and transmit it to a suitable receiver device to be performed by the data processing device. The computer storage medium can be a machine-readable storage device, a machine-readable storage substrate, a random or serial access memory device, or a combination of one or more of them.

The processing and logic flows described in the present disclosure can be executed by one or more programmable computers executing one or more computer programs to perform corresponding functions by operating according to input data and generating output. The processing and logic flow can also be executed by a dedicated logic circuit, such as FPGA (Field Programmable Gate Array) or ASIC (Application Specific integrated Circuit), and the device can also be implemented as a dedicated logic circuit.

A computer suitable for executing a computer program can include, for example, a general-purpose and/or special-purpose microprocessor, or any other type of central processing unit. Generally, the central processing unit will receive instructions and data from a read-only memory and/or random access memory. The basic components of a computer can include a central processing unit for implementing or executing instructions and one or more memory devices for storing instructions and data. Generally, the computer will also include one or more mass storage devices for storing data, such as magnetic disks, magneto-optical disks, or optical disks, etc., or the computer will be operatively coupled with this mass storage device to receive data or send data to it, or both. However, the computer does not have to have such equipment. In addition, the computer can be embedded in another device, such as a mobile phone, a personal digital assistant (PDA), a mobile audio or video player, a game console, a global positioning system (GPS) receiver, or a universal serial bus (USB) flash drives are portable storage devices, to name a few.

Computer readable media suitable for storing computer program instructions and data can include all forms of non-transitory memory, media and memory devices, such as semiconductor memory devices (such as EPROMs, EEPROMs and flash memory devices), magnetic disks (such as internal hard disks or removable disks), magneto-optical disks, CD ROMs and DVD-ROM disks. The processor and the memory can be supplemented by or incorporated into a dedicated logic circuit.

Although the present disclosure contains many specific implementation details, these should not be construed as limiting any disclosed scope or claimed scope, but are mainly used to describe the features of specific disclosed examples. Certain features described in a plurality of examples in the present disclosure can also be implemented in combination in a single example. On the other hand, various features described in a single example can also be implemented in a plurality of examples separately or in any suitable sub-combination. In addition, although features can function in certain combinations as described above and even as originally claimed, one or more features from the claimed combination can in some cases be removed from the combination, and the claimed combination can refer to a sub-combination or a variant of the sub-combination.

Similarly, although operations are depicted in a specific order in the drawings, this should not be construed as requiring these operations to be performed in the specific order shown or sequentially, or requiring all illustrated operations to be performed to achieve the desired result. In some cases, multitasking and parallel processing can be advantageous. In addition, the separation of various system modules and components in the examples should not be understood as requiring such separation in all examples, and it should be understood that the described program components and systems can usually be integrated in a single software product, or packaged into a plurality of software products.

Thus, specific examples of the subject matter have been described. Other examples are within the scope of the appended claims. In some cases, the actions recited in the claims can be performed in a different order and still achieve desired results. In addition, the processes depicted in the drawings are not necessarily in the specific order or sequential order shown in order to achieve the desired result. In some implementations, multitasking and parallel processing can be advantageous.

The above are only preferred examples of one or more examples of the present disclosure, and are not used to limit one or more examples of the present disclosure. Any modification, equivalent replacement, improvement within the spirit and principle of one or more examples of the present disclosure shall be included in the protection scope of one or more examples of the present disclosure.

What is claimed is:

1. A method for predicting correlation between objects, comprising:
   detecting a first object, a second object, and a third object involved in a target image, wherein the first object and the second object represent different body parts, and the third object indicates a body object;
   determining a joint bounding box surrounding the first object, the second object, and the third object; and
   predicting correlation between the first object and the second object based on a region corresponding to the joint bounding box in the target image;
   further comprising:
   determining correlated objects involved in the target image based on a prediction result of the correlation between the first object and the second object;
   wherein the prediction result of the correlation comprises a correlation prediction score,
   determining correlated objects involved in the target image based on the prediction result of the correlation between the first object and the second object comprises:
   selecting each from a plurality of object pairs, as a current object pair, in an order of respective correlation prediction scores of the object pairs from high to low, wherein the plurality of object pairs are obtained by combining each detected first object with each detected second object; and
   for the current object pair,
   based on determined correlated objects involved in the target image, determining a number of second objects that are correlated with the first object in the current object pair as a first number, and determining a number of first objects that are correlated with the second object in the current object pair as a second number; and
   in response to that the first number is lower than a first preset threshold, and the second number is lower than a second preset threshold, determining the first object and the second object in the current object pair as correlated objects involved in the target image.

2. The method of claim 1, wherein determining the joint bounding box surrounding the first object, the second object, and the third object comprises:
   determining a first surrounding box surrounding the first object and the second object based on respective detection results of the first object and the second object; and
   generating the joint bounding box surrounding the first object, the second object, and the third object based on the first surrounding box and a detection result of the third object.

3. The method of claim 2, wherein
   determining the first surrounding box surrounding the first object and the second object based on respective detection results of the first object and the second object comprises:
   obtaining one or more object pairs by combining each of one or more detected first objects with each of one or more detected second objects; and
   for each of the object pairs, determining a first surrounding box surrounding the object pair; and/or,
   for each of the object pairs, generating the joint bounding box surrounding the first object, the second object, and the third object based on the first surrounding box and the detection result of the third object comprises:

obtain one or more ternary object sets by combining the object pair with each of one or more third objects, wherein the object pairs are obtained by combining each detected first object with each detected second object; and for each of the ternary object sets, generating a joint bounding box surrounding the ternary object set based on the first surrounding box of the object pair and a detection result of the third object in the ternary object set.

4. The method of claim 2, wherein
the detection result comprises a bounding box; and
generating the joint bounding box surrounding the first object, the second object, and the third object based on the first surrounding box and the detection result of the third object comprises:
selecting one from a bounding box of a respective detected third object, as a target bounding box corresponding to the first surrounding box, in a way that an overlapping area between the selected bounding box and the first surrounding box is largest; and
generating the joint bounding box surrounding the first object, the second object, and the third object based on the first surrounding box and the target bounding box.

5. The method of claim 4, wherein
the joint bounding box indicates an externally-connected joint bounding box which is externally connected with the bounding box of the third object; or
the joint bounding box indicates an externally-connected joint bounding box which is externally connected with the first surrounding box and the bounding box of the third object.

6. The method of claim 2, wherein further comprises at least one of:
the first surrounding box indicates one of bolding boxes surrounding the first object and the second object of which area is smallest; or,
the joint bounding box indicates an externally-connected joint bounding box which is externally connected with the first surrounding box.

7. The method of claim 1, wherein predicting correlation between the first object and the second object based on the region corresponding to the joint bounding box in the target image comprises:
obtaining region features of the joint bounding box and respective region features of the first object and the second object surrounded by the joint bounding box by inputting the joint bounding box and respective bounding boxes of the first object and the second object surrounded by the joint bounding box into a region feature extraction unit;
obtaining a spliced feature of a preset length by splicing the region features of the joint bounding box, the respective region features of the first object and the second object surrounded by the joint bounding box, and respective position features of the first object and the second object surrounded by the joint bounding box; and
predicting correlation between the first object and the second object based on the spliced feature.

8. The method of claim 7, further comprising:
outputting a detection result of the correlated objects involved in the target image.

9. The method of claim 1, wherein the correlation between the first object and the second object comprises a confidence regarding that the first object and the second object belong to one same body object.

10. The method of claim 1, wherein the first object comprises a face object; and the second object comprises a hand object.

11. The method of claim 1, wherein
detecting the first object, the second object, and the third object in the target image comprises:
detecting the first object, the second object, and the third object involved in the target image with a target object detecting model;
predicting the correlation between the first object and the second object based on the region corresponding to the joint bounding box in the target image comprises:
predicting the correlation between the first object and the second object based on the region corresponding to the joint bounding box in the target image with a correlation predicting model;
wherein the target object detecting model and the correlation predicting model are trained by:
training the target object detecting model based on a first training sample set which comprises a plurality of training samples with respective first label information, wherein the first label information comprises respective bounding boxes of a first object, a second object, and a third object; and
jointly training the target object detecting model and the correlation predicting model based on a second training sample set which comprises a plurality of training samples with respective second label information, wherein the second label information comprises respective bounding boxes of a first object, a second object, and a third object, and respective label information on correlations between first objects and second objects.

12. An electronic device comprising:
at least one processor; and
one or more memories coupled to the at least one processor and storing programming instructions for execution by the at least one processor to perform operations for predicting correlation between objects, the operations comprising:
detecting a first object, a second object, and a third object involved in a target image, wherein the first object and the second object represent different body parts, and the third object indicates a body object;
determining a joint bounding box surrounding the first object, the second object, and the third object; and
predicting correlation between the first object and the second object based on a region corresponding to the joint bounding box in the target image;
further comprising:
determining correlated objects involved in the target image based on a prediction result of the correlation between the first object and the second object;
wherein the prediction result of the correlation comprises a correlation prediction score,
determining correlated objects involved in the target image based on the prediction result of the correlation between the first object and the second object comprises:
selecting each from a plurality of object pairs, as a current object pair, in an order of respective correlation prediction scores of the object pairs from high to low, wherein the plurality of object pairs are obtained by combining each detected first object with each detected second object; and for the current object pair, based on determined correlated objects involved in the target image, determining a number of second objects that are correlated with the first object in the current object pair as a first number, and determining a number of first objects that are correlated with the second object in the current object pair as a second number; and in response to that the first number is lower than a first preset threshold, and the second number is lower than a second preset threshold, determining the first object and the second object in the current object pair as correlated objects involved in the target image.

13. The electronic device according to claim 12, wherein determining the joint bounding box surrounding the first object, the second object, and the third object comprises:

determining a first surrounding box surrounding the first object and the second object based on respective detection results of the first object and the second object; and generating the joint bounding box surrounding the first object, the second object, and the third object based on the first surrounding box and a detection result of the third object.

14. The electronic device according to claim 13, determining the first surrounding box surrounding the first object and the second object based on respective detection results of the first object and the second object comprises:

obtaining one or more object pairs by combining each of one or more detected first objects with each of one or more detected second objects; and for each of the object pairs, determining a first surrounding box surrounding the object pair; and/or, for each of the object pairs, generating the joint bounding box surrounding the first object, the second object, and the third object based on the first surrounding box and the detection result of the third object comprises:

obtain one or more ternary object sets by combining the object pair with each of one or more third objects, wherein the object pairs are obtained by combining each detected first object with each detected second object; and for each of the ternary object sets, generating a joint bounding box surrounding the ternary object set based on the first surrounding box of the object pair and a detection result of the third object in the ternary object set.

15. The electronic device according to claim 13, wherein the detection result comprises a bounding box; and generating the joint bounding box surrounding the first object, the second object, and the third object based on the first surrounding box and the detection result of the third object comprises:

selecting one from a bounding box of a respective detected third object, as a target bounding box corresponding to the first surrounding box, in a way that an overlapping area between the selected bounding box and the first surrounding box is largest; and generating the joint bounding box surrounding the first object, the second object, and the third object based on the first surrounding box and the target bounding box.

16. The electronic device according to claim 15, wherein the joint bounding box indicates an externally-connected joint bounding box which is externally connected with the bounding box of the third object; or the joint bounding box indicates an externally-connected joint bounding box which is externally connected with the first surrounding box and the bounding box of the third object.

17. The electronic device according to claim 13, wherein the operations further comprise at least one of:

the first surrounding box indicates one of bounding boxes surrounding the first object and the second object of which area is smallest; or, the joint bounding box indicates an externally-connected joint bounding box which is externally connected with the first surrounding box.

18. A non-transitory computer-readable storage medium coupled to the at least one processor and storing programming instructions for execution by the at least one processor, wherein the programming instructions instruct the at least one processor to perform operations for predicting correlation between objects, the operations comprising:

detecting a first object, a second object, and a third object involved in a target image, wherein the first object and the second object represent different body parts, and the third object indicates a body object;

determining a joint bounding box surrounding the first object, the second object, and the third object; and predicting correlation between the first object and the second object based on a region corresponding to the joint bounding box in the target image;

further comprising:

determining correlated objects involved in the target image based on a prediction result of the correlation between the first object and the second object;

wherein the prediction result of the correlation comprises a correlation prediction score, determining correlated objects involved in the target image based on the prediction result of the correlation between the first object and the second object comprises:

selecting each from a plurality of object pairs, as a current object pair, in an order of respective correlation prediction scores of the object pairs from high to low, wherein the plurality of object pairs are obtained by combining each detected first object with each detected second object; and for the current object pair, based on determined correlated objects involved in the target image, determining a number of second objects that are correlated with the first object in the current object pair as a first number, and determining a number of first objects that are correlated with the second object in the current object pair as a second number; and in response to that the first number is lower than a first preset threshold, and the second number is lower than a second preset threshold, determining the first object and the second object in the current object pair as correlated objects involved in the target image.

* * * * *